(12) United States Patent
Seo (10) Patent No.: US 9,770,985 B2
(45) Date of Patent: Sep. 26, 2017

(54) SYSTEM FOR GUIDING ECONOMIC DRIVING, VEHICLE APPLIED TO THE SAME, AND METHOD THEREOF

(71) Applicant: HYUNDAI MOTOR COMPANY, Seoul (KR)

(72) Inventor: Yoo-Jin Seo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/693,844

(22) Filed: Apr. 22, 2015

(65) Prior Publication Data

US 2016/0121894 A1    May 5, 2016

(30) Foreign Application Priority Data

Oct. 31, 2014    (KR) .......................... 10-2014-0149707

(51) Int. Cl.
| | |
|---|---|
| *G06F 7/00* | (2006.01) |
| *B60K 35/00* | (2006.01) |
| *B60W 50/14* | (2012.01) |
| *G07C 5/00* | (2006.01) |
| *G07B 15/06* | (2011.01) |

(52) U.S. Cl.
CPC ............. *B60K 35/00* (2013.01); *B60W 50/14* (2013.01); *B60W 2540/10* (2013.01); *B60W 2540/12* (2013.01); *B60W 2540/16* (2013.01); *B60W 2550/40* (2013.01); *B60W 2550/402* (2013.01); *B60W 2550/404* (2013.01); *G07B 15/063* (2013.01); *G07C 5/008* (2013.01)

(58) Field of Classification Search
CPC ...... B60W 30/00; B60W 30/09; B60W 30/12; B60W 30/16; B60W 30/18; B60W 30/18072; B60W 50/085; B60W 30/02; B60W 30/06; B60W 30/08; B60W 30/0956; B60W 30/14; B60W 30/184; B60W 30/188; B60K 35/00
See application file for complete search history.

(56) References Cited

U.S. PATENT DOCUMENTS

| | | | |
|---|---|---|---|
| 7,877,198 B2 * | 1/2011 | Tenzer ................... | G06Q 10/04 |
| | | | 123/339.17 |
| 8,548,673 B2 | 10/2013 | Hada | |

(Continued)

FOREIGN PATENT DOCUMENTS

| | | |
|---|---|---|
| JP | 3891404 B2 | 3/2007 |
| JP | 2009-251826 A | 10/2009 |

(Continued)

*Primary Examiner* — Nicholas Kiswanto
*Assistant Examiner* — Kenny A Taveras
(74) *Attorney, Agent, or Firm* — McDermott Will & Emery LLP (57) ABSTRACT

A system for guiding economic driving may include a vehicle generating driving information in accordance with driving. A vehicle management server is configured to receive and store vehicle information and driver information of the vehicle from the vehicle. A vehicle terminal configured to store the vehicle information and transmit the driving information. A business management server is configured to generate economic driving evaluation information according to a preset economic driving algorithm using the driving information.

15 Claims, 5 Drawing Sheets

(56) References Cited

U.S. PATENT DOCUMENTS

| | | | | |
|---|---|---|---|---|
| 8,610,401 B2* | 12/2013 | Kim | ............... | B60L 11/1838 180/65.1 |
| 8,635,018 B2* | 1/2014 | Chia | ............... | G07C 5/008 701/25 |
| 8,818,697 B2 | 8/2014 | Rovik et al. | | |
| 8,849,499 B2* | 9/2014 | Profitt-Brown | ......... | B60K 35/00 340/426.18 |
| 8,981,942 B2* | 3/2015 | He | ............... | B60Q 9/00 340/521 |
| 8,983,719 B2* | 3/2015 | Ukai | ............... | G06F 17/00 701/1 |
| 9,082,308 B2* | 7/2015 | Armitage | ............... | B60W 40/09 |
| 9,230,144 B2* | 1/2016 | Kawasaki | ............... | G06K 7/10009 |
| 9,251,627 B2* | 2/2016 | Carl | ............... | G07C 5/008 |
| 2006/0180371 A1* | 8/2006 | Breed | ............... | G07C 5/008 180/197 |
| 2006/0224294 A1* | 10/2006 | Kawazoe | ............... | B60W 30/143 701/93 |
| 2011/0054769 A1* | 3/2011 | Krengiel | ............... | B60W 30/188 701/123 |
| 2011/0098880 A1* | 4/2011 | Basir | ............... | G07C 5/008 701/31.4 |
| 2011/0130905 A1* | 6/2011 | Mayer | ............... | G07C 5/008 701/22 |
| 2013/0116909 A1* | 5/2013 | Shida | ............... | B60W 30/16 701/96 |
| 2014/0088815 A1* | 3/2014 | Kitagishi | ............... | B60W 50/0098 701/29.1 |
| 2014/0336884 A1* | 11/2014 | Roder | ............... | B60W 30/18 701/51 |
| 2015/0035665 A1* | 2/2015 | Plante | ............... | G07C 5/008 340/438 |
| 2015/0039175 A1* | 2/2015 | Martin | ............... | G06Q 40/08 701/31.5 |
| 2015/0112546 A1* | 4/2015 | Ochsendorf | ......... | B60W 50/14 701/33.4 |
| 2015/0175003 A1* | 6/2015 | Chao | ............... | B60K 35/00 701/1 |
| 2015/0269790 A1* | 9/2015 | Batcheller | ............... | G08G 1/20 701/537 |
| 2015/0279129 A1* | 10/2015 | Ishikawa | ............... | B60K 35/00 701/29.1 |
| 2016/0016470 A1* | 1/2016 | Pichlmaier | ............... | B60K 35/00 701/34.2 |
| 2016/0059697 A1* | 3/2016 | Ann | ............... | B60K 35/00 701/96 |
| 2016/0063773 A1* | 3/2016 | Hatton | ............... | G07C 5/085 701/29.1 |
| 2016/0071338 A1* | 3/2016 | McQuade | ......... | G06Q 30/0282 701/51 |
| 2016/0121894 A1* | 5/2016 | Seo | ............... | B60K 35/00 701/36 |

FOREIGN PATENT DOCUMENTS

| | | |
|---|---|---|
| KR | 2010-0110102 A | 10/2010 |
| KR | 10-2010-0122224 A | 11/2010 |
| KR | 10-2013-0047166 A | 5/2013 |
| KR | 10-1276949 B1 | 6/2013 |

* cited by examiner

SYSTEM FOR GUIDING ECONOMIC DRIVING, VEHICLE APPLIED TO THE SAME, AND METHOD THEREOF

CROSS-REFERENCE(S) TO RELATED APPLICATION(S)

This application claims the benefit of priority to Korean Patent Application No. 10-2014-0149707 filed on Oct. 31, 2014, the entire content of which is incorporated herein by reference.

TECHNICAL FIELD

The present disclosure relates to guiding economic driving, and more particularly, to a system for guiding economic driving using a high pass system, a vehicle applied to the same, and a method thereof.

BACKGROUND

With the development of a hybrid vehicle or an electric vehicle using an environmentally-friendly technology, a technology of increasing energy efficiency of various kinds of vehicles including the existing vehicle using fossil fuel is also important in environment conservation and energy saving.

Accordingly, a method of improving fuel efficiency of a vehicle itself and an economic driving system by an operation of a driver have been developed.

The economic driving system informs various driving conditions of a driver by additionally installing various types of sensors in the vehicle to assist the driver to perform economic driving meeting surrounding traffic conditions in real time.

If the driver is not aware of an economic driving method, the economic driving system relies on only a manual operation of the driver, and therefore, an economic effect due to fuel saving does not appear.

Further, since the economic effect variously appears according to a driving skill, it is difficult to maximize energy efficiency.

The fuel efficiency method of the vehicle itself is a fuel efficiency authentication method which increases the energy efficiency to increase a driving distance to fuel efficiency.

However, as various research results, it is more efficient for the driver to actively guide fuel efficiency driving than improving fuel efficiency and reducing pollutants by the improvement in a vehicle technology.

In other words, a vehicle controller calculates instant fuel consumption and transmits the calculated value to a cluster so that a driver is aware of fuel efficiency for himself/herself. Therefore, a reward system of allowing a driver to use fuel consumption information depending on the fuel efficiency to perform the economic driving is required.

SUMMARY

The present disclosure is directed to a system for guiding economic driving allowing a driver to guide a fuel efficiency operation, a vehicle applied to the same, and a method thereof.

Other objects and advantages of the present disclosure can be understood by the following description, and become apparent with reference to the embodiments of the present inventive concept. Also, it is obvious to those skilled in the art to which the present invention pertains that the objects and advantages of the present disclosure can be realized by the means as claimed and combinations thereof.

An aspect of the present inventive concept provides a system for guiding economic driving allowing a driver to guide a fuel efficiency operation for himself/herself.

In accordance with an embodiment of the present inventive concept, a system for guiding economic driving includes a vehicle configured to generate driving information in accordance with driving. A vehicle management server is configured to receive and store vehicle information and driver information of the vehicle from the vehicle. A vehicle terminal is configured to store the vehicle information and to transmit the driving information. A business management server is configured to generate economic driving evaluation information upon a preset economic driving algorithm using the driving information.

The vehicle may include a driving manipulator configured to manipulate driving. A vehicle controller is configured to drive the vehicle depending on the driving manipulation and generate the driving information depending on the driving. A telematics unit (TMU) is configured to transmit the vehicle information and/or the driver information to the business management server.

The vehicle may further include a cluster configured to display economic driving evaluation information or the driving information.

The vehicle information may be generated by using at least one of a vehicle identification number, a vehicle controller data number, and vehicle terminal information.

Whenever the vehicle starts, the vehicle controller and the vehicle terminal may primarily confirm matchability of the vehicle information.

The vehicle management server and the business management server may secondarily confirm the matchability of the vehicle information.

The driving information may include fuel efficiency information, a driving distance, accelerator pedal and brake pedal manipulation information, a gear manipulation level, an idling time accumulation value, and a vehicle mileage, and the fuel efficiency may be at least one of instant fuel efficiency and fuel efficiency variation for each driving distance.

The driving information may further include software change information and/or data change information, and the like of the vehicle controller to prevent the fuel efficiency information from being changed due to modification of the vehicle controller.

The vehicle controller may compare a change trend of the driving information with a preset driving condition to determine matchability of the driving information and to reset the driving information upon a determination result.

The preset driving condition may be any one of highest fuel efficiency of the vehicle, fuel efficiency per distance, and variations for each distance.

The vehicle terminal may be a high pass terminal.

The economic driving evaluation information may include a grade and a discount rate.

In accordance with another embodiment of the present inventive concept, a vehicle for guiding economic driving includes a driving manipulator configured to manipulate driving. A vehicle controller is configured to drive the vehicle depending on the driving manipulation and generate the driving information in accordance with the driving. A telematics unit (TMU) is configured to transmit vehicle information and driver information to a business management server. A vehicle terminal is configured to store the vehicle information and transmit the driving information.

In accordance with still another embodiment of the present inventive concept, a method for guiding economic driving includes generating and storing vehicle information and driver information. The vehicle information and the driver information are received and stored from the vehicle by a vehicle management server. Driving information is generated in accordance with driving by the vehicle. The vehicle information is stored by a vehicle terminal, and the driving information is transmitted by a vehicle terminal. Economic driving evaluation information is generated by a business management server according to a preset economic driving algorithm using the driving information.

The method further may include displaying the economic driving evaluation information or the driving information on a cluster of the vehicle.

The vehicle information may be generated by using at least one of a vehicle identification number, a vehicle controller data number, and vehicle terminal information.

The step of storing the information of the vehicle may include primarily confirming matchability of the vehicle information whenever the vehicle starts.

The step of storing the vehicle management server may include secondarily confirming, by the vehicle management server and the business management server, the matchability of the vehicle information.

The step of generating the driving information may include comparing a change trend of the driving information with a preset driving condition to determine matchability of the driving information and resetting the driving information upon a determination result.

DETAILED DESCRIPTION

Since the present inventive concept may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present disclosure.

Throughout the accompanying drawings, the same reference numerals will be used to describe the same components.

Terms used in the specification, 'first,' 'second,' etc., may be used to describe various components, but the components are not to be interpreted to be limited to the terms. The terms are used to distinguish one component from another component.

Therefore, the first component may be referred to as the second component, and the second component may be referred to as the first component. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art.

It must be understood that the terms defined by the dictionary are identical with the meanings within the context of the related art, and they should not be ideally or excessively formally defined unless the context clearly dictates otherwise.

Hereinafter, a system for guiding economic driving using a high pass system, a vehicle applied to the same, and a method thereof will be described in detail with reference to the accompanying drawings.

Figure 1:
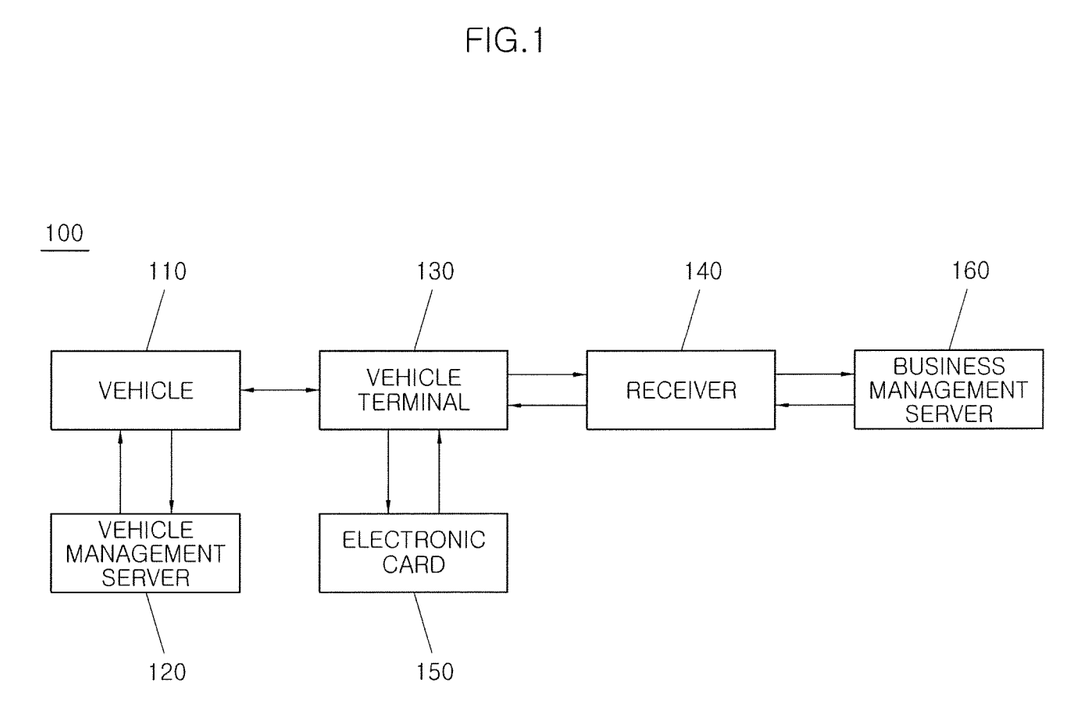
FIG. 1 is a block diagram of a configuration of a system for guiding economic driving according to an exemplary embodiment of the present inventive concept.

FIG. 1 is a block diagram of a configuration of a system for guiding economic driving according to an exemplary embodiment of the present inventive concept. Referring to FIG. 1, a system 100 for guiding economic driving includes a vehicle 110 generating driving information depending on driving. A vehicle management server 120 receives and stores vehicle information and/or driver information of the vehicle 110 from the vehicle. A vehicle terminal 130 stores the vehicle information and transmits the driving information. A business management server 160 generates economic driving evaluation information depending on a preset economic driving algorithm using the driving information.

An example of the vehicle 110 may include green cars, such as a hybrid electric vehicle (HEV), a plug-in hybrid electric vehicle (PHEV), an electric vehicle (EV), a neighborhood electric vehicle (NEV), a fuel-cell vehicle (FCV), and a clean diesel vehicle (CDV), and general vehicles such as gasoline and diesel.

The vehicle server 120 is managed by car makers and stores the vehicle information and the driver information. Further, the vehicle information, which is stored in the vehicle server 120, is compared with the driver information, which is stored in the business management server 160, in advance to confirm a legal vehicle and/or driver.

The vehicle terminal 130 communicates with the vehicle 110 to transmit the driving information stored in the vehicle to the business management server 160. In particular, the vehicle terminal 130 may be installed in the vehicle 110 and when the vehicle 110 is positioned in a tollgate, a government office, an inspection office, a mart, a park, and the like, the vehicle terminal 130 transmits the vehicle information to the business management server 160 in real time via receivers.

The vehicle terminal 130 may be a high pass terminal and the vehicle terminal 130 includes an electronic card 150 having vehicle information. Further, the electronic card 150 may be a separate personal recognition apparatus. The vehicle information of the electronic card 150 is stored in the vehicle controller (not illustrated) of the vehicle. Further, the vehicle terminal 130 transmits the driving information, and the like, generated from the vehicle to the business management server 160 through a receiver 140, and the like.

The receiver 140 receives the driving information, the vehicle information, and/or the driving information, and the like from the vehicle terminal 130 and transmits the information to the business management server 160.

Figure 2:
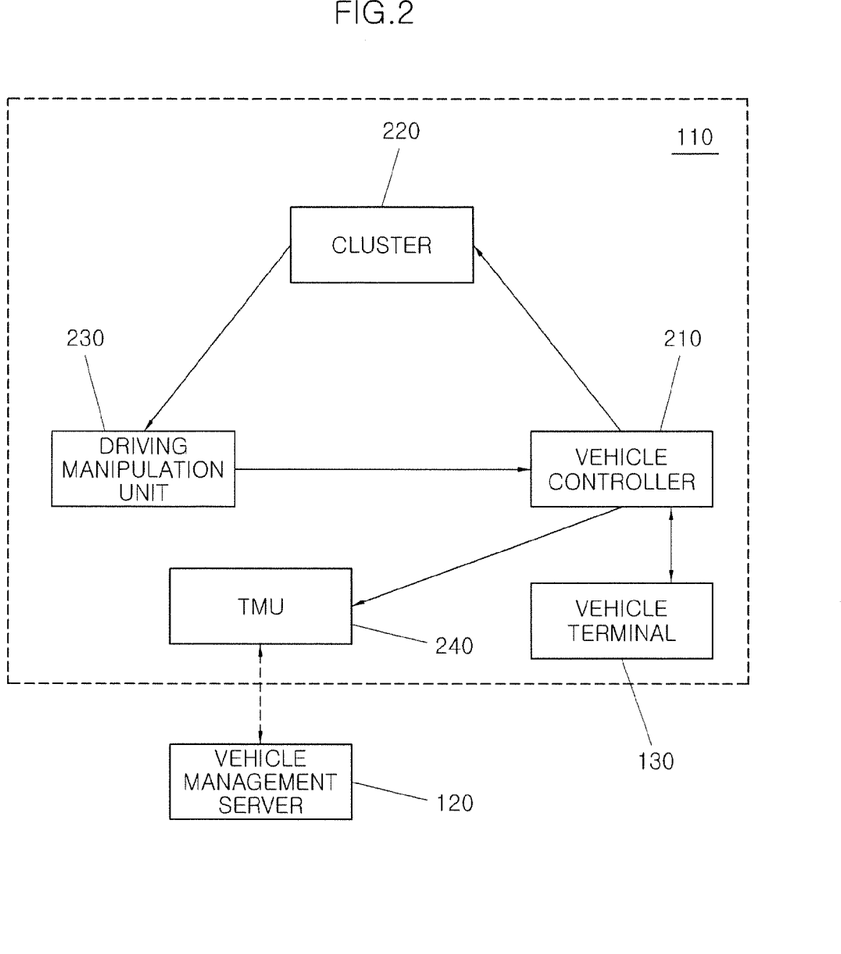
FIG. 2 is a block diagram of a configuration of a vehicle illustrated in FIG. 1.

The business management server 160 receives and stores the driving information, the vehicle information, and/or the driving information, and the like from the vehicle terminal 130. Further, the business management server 160 uses the driving information received through the vehicle terminal 130 to generate the economic driving evaluation information depending on a preset economic driving algorithm. In other words, FIG. 2 is a block diagram of a configuration of the vehicle 110 illustrated in FIG. 1. Referring to FIG. 2, the vehicle 110 includes a driving manipulator 230 configured to manipulate driving, a vehicle controller 210 configured to drive the vehicle depending on the driving manipulation and generate the driving information depending on driving. A telematics unit (TMU) 240 is configured to transmit the vehicle information and/or the driver information to the business management server 160 (FIG. 1). A vehicle terminal 130 is configured to store the vehicle information and transmit the driving information to outside. A cluster 220 is configured to display the economic driving evaluation information, the driving information, running information, manipulation information, and the like.

Further, the vehicle terminal 130 may also be installed in the vehicle 110 and is separately mounted at one side of the vehicle 110.

The vehicle controller 210 may be an "electronic control unit (ECU)", a "hybrid control unit (HCU)", and the like, according to a vehicle kind. Further, the vehicle controller 210 stores the vehicle information, the driver information, and the like which are stored in the vehicle terminal 130.

The vehicle controller 210 stores the vehicle information which is generated by combining a vehicle identification number, a vehicle controller data number, the vehicle terminal information, and/or the like and transmits the vehicle information to the business management server 160 (FIG. 1) and/or the vehicle terminal 130. The vehicle information is a security code for protecting personal information. The vehicle identification number and the vehicle controller data number are generated and stored at the time of manufacturing the vehicle. Further, the vehicle terminal information may include high pass information. In particular, the vehicle terminal 130 may be the authenticated high pass terminal.

Further, the vehicle controller 210 primarily confirms matchability of the stored vehicle information of the vehicle terminal 130 whenever the vehicle 110 starts.

Further, the vehicle information is also transmitted to the vehicle management server 120 (FIG. 1) and the vehicle management server 120 (FIG. 1), and the business management server secondarily confirms the matchability of the vehicle information. That is, the matchability of the vehicle information is confirmed doubly. When any one of the primary matchability and the secondary matchability does not coincide with the vehicle information, the economic driving evaluation information is reset. The economic driving evaluation information may be, a discount rate applied to a grade, a toll, and the like.

The driving manipulator 230 has a handle, a start key, an accelerator pedal, a brake pedal, a gear transmission, and the like. Therefore, the vehicle controller 210 first generates information by the driving manipulator 230. The driving information may include fuel efficiency information, a driving distance, accelerator pedal and brake pedal manipulation information, a gear manipulation level, an idling time accumulation value, a vehicle mileage, and the like. Further, the fuel efficiency may be instant fuel efficiency, fuel efficiency variation for each driving distance, and the like.

Further, the driving information includes software change information and/or data change information, and the like of the vehicle controller 210 to prevent the fuel efficiency information from being changed due to modification of the vehicle controller 210.

The cluster 220 displays the economic driving evaluation information, the driving information, the running information, the manipulation information, and the like. Further, the cluster 220 may output the information as a sound. To this end, the cluster 220 may include a sound system.

The telematics unit (TMU) transmits the vehicle information, and the like to the vehicle management server 120.

For the communication between the vehicle controller 210 and the vehicle terminal 130, a CAN communication method is mainly used but is not limited thereto but communication methods such as power line communication (PLC), control pilot (CP), Zigbee®, and BLUETOOTH may be used.

Figure 3:
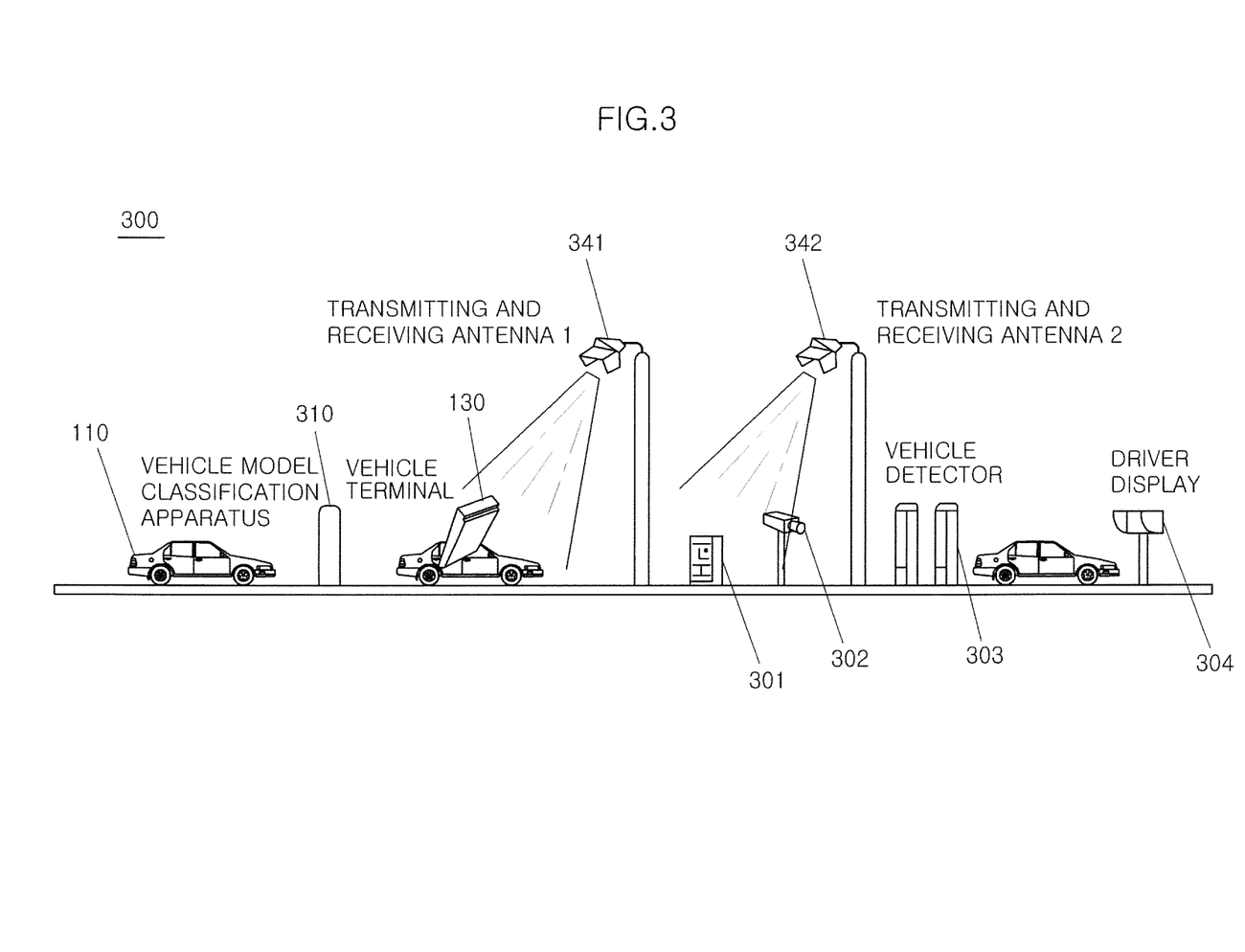
FIG. 3 is a conceptual diagram of a general tollgate.

FIG. 3 is a conceptual diagram of a general tollgate. Referring to FIG. 3, the tollgate 300 includes a vehicle model classification apparatus 310 configured to classify a model of the vehicle 110. A first transmitting and receiving antenna 341 and a second transmitting and receiving antenna 342 transmit and receive data to and from the vehicle terminal 130. A lane controller 301 is configured to control a lane for the vehicle 110. A violation vehicle photographing apparatus 302 is configured to photograph the vehicle which violates traffic rules. A vehicle detector 303 collects traffic information, and a driver display 304 displays toll cost and the like to a driver.

Figure 4:
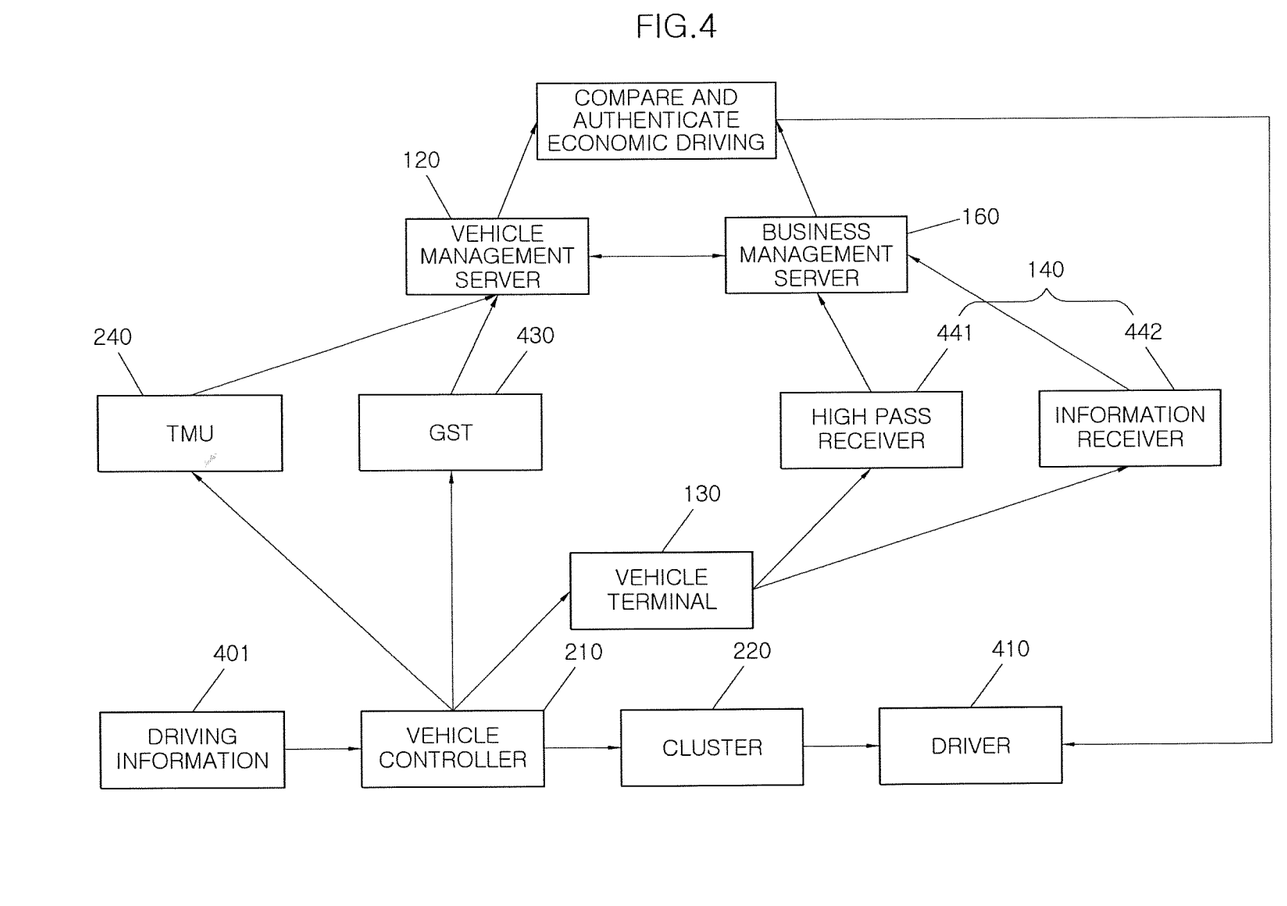
FIG. 4 is a conceptual diagram for guiding economic driving according to the system for guiding economic driving illustrated in FIG. 1.

FIG. 4 is a diagram for guiding economic driving according to the system for guiding economic driving illustrated in FIG. 1. Referring to FIG. 4, when driving information 401 is generated, the vehicle controller 210 transmits the generated driving information 401 to the business management server 160 through the vehicle terminal 130.

Further, the vehicle information, the driver information, and the like are transmitted to the vehicle management server 120 through the TMU 240 or a general scan tool (GST) 430. Additionally, the vehicle information, the driver information, and the like are transmitted to the business management server 160 through the vehicle terminal 130.

The GST 430 is used in the case in which there is no TMU. In the case of the communication between the vehicle server 120 and the TMU 240, an Internet wireless communication network may be used and in the case of the communication between the GST 430 and the vehicle management server 120, the Intranet may be used.

For the communication between the business management server 160 and the vehicle terminal 130, a high pass receiver 441 or an information receiver 442 are used. In particular, the information receiver 442 is installed at places, such as a government office, a regular inspection shop, a mart, a park, and the like, which may automatically recognize a vehicle number.

For the communication between the vehicle terminal 130 and the receiver 140, near field communication such as radio frequency identification (RFID) and BLUETOOTH may be used.

The business management server 160 interlocks with the vehicle management server 120 to compare the vehicle information, the driver information, and the like, to generate the economic driving evaluation information depending on the driving information, and to authenticate the information and provide the information to the driver 410. The economic driving evaluation information may also be provided through home page of a business and may also be provided on/off line at the time of visiting a management business for repairing. Therefore, the driver may share the economic driving information and the vehicle management server 120 and/or the business management server 160 may also provide the economic driving method.

Figure 5:
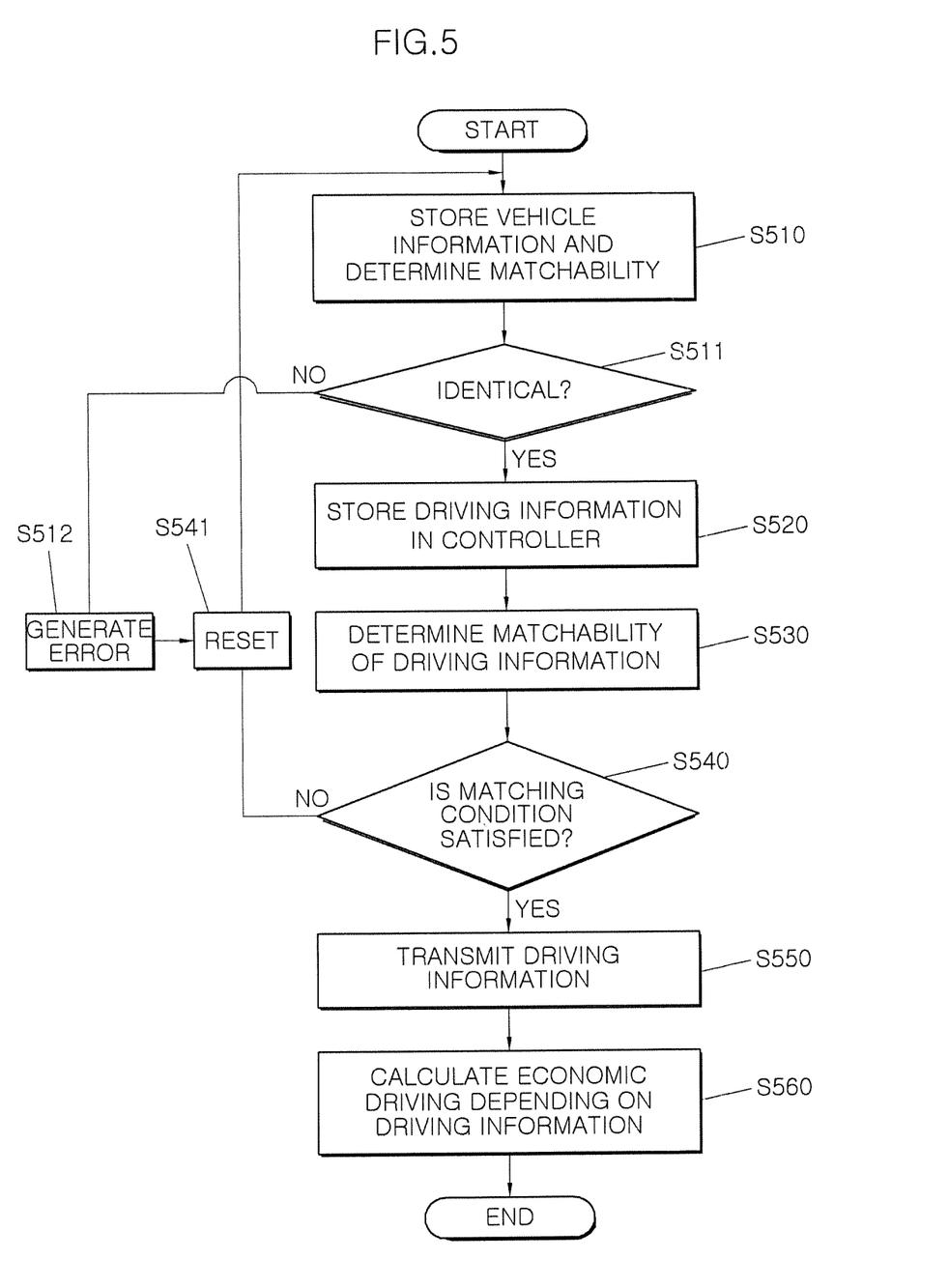
FIG. 5 is a flow chart illustrating a process of guiding economic driving according to the exemplary of the present inventive concept.

FIG. 5 is a flow chart illustrating a process of guiding economic driving according to the exemplary of the present inventive concept. Referring to FIG. 5, the vehicle 110 (FIG. 1) generates and stores the vehicle information and/or the driver information and transmits the information to the vehicle management server 120 (FIG. 1).

Therefore, the vehicle management server 120 receives and stores the vehicle information and the driver information from the vehicle 110 and determines matching of the vehicle information whenever the vehicle starts (steps S510 and S511). In other words, whenever the vehicle 110 starts, the matchability of the vehicle information between the vehicle terminal 130 and the vehicle controller 210 (FIG. 2) is primarily confirmed and the matchability of the vehicle information between the vehicle management server 120, and the business management server 160 is secondarily confirmed. When any one of them is not matched (that is, same) between the stored information, the error is generated and reset (steps S512 and S541).

In step S511, when the matchability between the stored vehicle information is recognized, the vehicle controller 210 generates and stores the driving information depending on the driving and determines the matchability of the driving information (steps S520, S530, and S540). In other words, it is determined whether the driving information is the driving information which may not emerge from the real driving condition which is a matchability condition by diagnosing a change trend of the driving information.

As a determination result, when the driving information satisfies the matchability condition, the vehicle controller 210 transmits the driving information to the business management server 160, and the business management server 160 uses the driving information to generate the economic driving evaluation information depending on a preset economic driving algorithm (steps S550 and S560).

In step S540, when the driving information does not satisfy the matchability condition, the vehicle controller 210 resets the current driving information and repeatedly performs steps S510 to S540.

According to the exemplary embodiments of the present inventive concept, it is possible to allow car makers and public institutions to jointly manage the fuel efficiency driving data of the driver and performing the reward (for example, charge saving like discount of a high pass for commuting) therefor, thereby guiding the driver the fuel efficiency operation.

Further, it is possible to allow the engine control unit (ECU) to store the fuel consumption information for himself/herself and use regulations (for example, discount of toll, vehicle tax, insurance, and the like) for fuel driving by associating the fuel consumption information with the high pass for the vehicle and the communication system of the tollgate, the smart phone, or the system of the car maker itself.

The foregoing exemplary embodiments are only examples to allow a person having ordinary skill in the art to which the present inventive concept pertains (hereinafter, referred to as "those skilled in the art") to easily practice the present disclosure. Accordingly, the present inventive concept is not limited to the foregoing exemplary embodiments and the accompanying drawings, and therefore, a scope of the present inventive concept is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present disclosure.

What is claimed is:

1. A system for guiding economic driving, comprising:
    a vehicle controller configured to generate driving information from a vehicle in accordance with driving;
    a vehicle management server configured to receive and store vehicle information and driver information of the vehicle;
    a vehicle terminal configured to store the vehicle information and transmit the driving information; and
    a business management server configured to generate economic driving evaluation information according to a preset economic driving algorithm using the driving information,
    wherein the vehicle controller and the vehicle terminal primarily confirm matchability of the vehicle information,
    wherein the vehicle management server and the business management server secondarily confirm the matchability of the vehicle information,
    wherein the vehicle information is generated by using combination of a vehicle identification number, a vehicle controller data number, and vehicle terminal information, and
    wherein the vehicle controller compares a change trend of the driving information with a preset driving condition to determine matchability of the driving information and resets the driving information upon a result of said comparison.

2. The system of claim 1, wherein the vehicle includes:
    a driving manipulator configured to manipulate driving; and
    a telematics unit (TMU) configured to transmit the vehicle information and the driver information to the business management server,
    wherein the vehicle controller is further configured to drive the vehicle depending on the driving manipulation and generate the driving information depending on the driving.

3. The system of claim 2, wherein the vehicle further comprising:
    a cluster configured to display economic driving evaluation infoiiiiation or the driving information.

4. The system of claim 2, wherein whenever the vehicle starts, the vehicle controller and the vehicle terminal primarily confirm the matchability of the vehicle information.

5. The system of claim 2, wherein the driving information includes fuel efficiency information, a driving distance, accelerator pedal and brake pedal manipulation information, a gear manipulation level, an idling time accumulation value, and a vehicle mileage, and fuel efficiency is at least one of instant fuel efficiency and fuel efficiency variation for each driving distance.

6. The system of claim 4, wherein the driving information further includes software change information and/or data change information of the vehicle controller to prevent the fuel efficiency information from being changed due to a modification of the vehicle controller.

7. The system of claim 1, wherein the preset driving condition is any one of highest fuel efficiency of the vehicle, fuel efficiency per distance, and variations for each distance.

8. The system of claim 1, wherein the vehicle terminal is a high pass terminal.

9. The system of claim 1, wherein the economic driving evaluation information includes a grade and a discount rate.

10. A vehicle for guiding economic driving, comprising:
a driving manipulator configured to manipulate driving;
a vehicle controller configured to drive the vehicle depending on the driving manipulation and generate driving information in accordance with driving;
a TMU configured to transmit vehicle information and driver information to a vehicle management server; and
a vehicle terminal configured to store the vehicle information and transmit the driving information to a business management server,
wherein the vehicle controller and the vehicle terminal primarily confirm first matchability of the vehicle information,
wherein the vehicle management server and the business management server secondarily confirm the matchability of the vehicle information,
wherein the vehicle information is generated by using combination of a vehicle identification number, a vehicle controller data number, and vehicle terminal information, and
wherein the vehicle controller compares a change trend of the driving information with a preset driving condition to determine matchability of the driving information and resets the driving information upon a result of said comparison.

11. The vehicle of claim 10, further comprising:
a cluster displaying economic driving evaluation information or the driving information.

12. A method for guiding economic driving, comprising steps of:
generating and storing, by a vehicle controller, vehicle information and driver information;
receiving and storing, by a vehicle management server, the vehicle information and the driver information from a vehicle;
generating driving information in accordance with driving;
storing, by a vehicle terminal, the vehicle information and transmitting the driving information; and
generating, by a business management server, economic driving evaluation information according to a preset economic driving algorithm using the driving information,
wherein the vehicle controller and the vehicle terminal primarily confirm first matchability of the vehicle information,
wherein the vehicle management server and the business management server secondarily confirm the matchability of the vehicle information,
wherein the vehicle information is generated by using combination of a vehicle identification number, a vehicle controller data number, and vehicle terminal information, and
wherein the step of generating the driving information includes comparing a change trend of the driving information with a preset driving condition to determine matchability of the driving information and resetting the driving information upon a result of said comparison.

13. The method of claim 12, further comprising:
displaying the economic driving evaluation information or the driving information on a cluster of the vehicle.

14. The method of claim 12, wherein the step of storing the information of the vehicle includes primarily confirming the matchability of the vehicle information whenever the vehicle starts.

15. The method of claim 12, wherein the driving information includes fuel efficiency information, a driving distance, accelerator pedal and brake pedal manipulation information, a gear manipulation level, an idling time accumulation value, and a vehicle mileage, and the fuel efficiency is at least one of instant fuel efficiency and fuel efficiency variation for each driving distance.

* * * * *